UNITED STATES PATENT OFFICE 2,649,444

PROCESS FOR THE PREPARATION OF AMINO KETONES

Paul Anthony Barrett, London, England, assignor to Burroughs Wellcome & Co. (U. S. A.) Inc., Tuckahoe, N. Y., a corporation of New York No Drawing. Application October 15, 1949, Serial No. 121,651. In Great Britain October 19, 1948

1 Claim. (Cl. 260—247.1)

The present invention relates to a novel process for the preparation of certain omega-(tertiary amino) alkyl ketones, and to the preparation of their corresponding quaternary salts.

The known method of preparing tertiary alcohols in which two of the alkyl groups are identical by the reaction of Grignard reagents and esters may be represented as follows:

R'COOAlk+2RMgX→
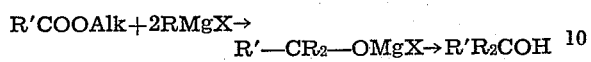

In the reaction represented above it is generally presumed that the preparation of the tertiary alcohol occurs through the intermediate formation of a ketone in a stepwise manner which may be represented as follows:

Step 1:

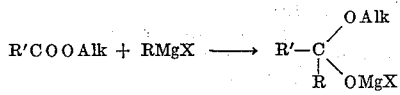

Step 2:

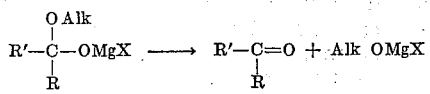

Step 3:

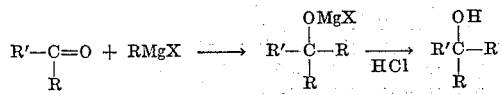

Although theoretically the reaction proceeds through the intermediate ketone stage, this phase of the reaction has not been demonstrated experimentally nor have more than occasional traces of ketones been found.

In accordance with this invention it has been discovered that Grignard reagents react with certain omega-(tertiary amino) alkyl esters to produce substantial and useful quantities of the corresponding ketone derivatives in the final product. These results are obtained although a substantial excess Grignard reagent is employed in the reaction which would be expected to follow the usual mechanism indicated above to produce the tertiary alcohol exclusively. Smaller amounts of Grignard reagent than quantities necessary to complete the several indicated reaction phases also result in producing substantial yields of omega-(tertiary amino) alkyl ketones.

Moreover, the ketones obtained from the selected reactants in accordance with the invention are easily isolated and purified. Quite surprisingly this reaction does not take place when a lithium alkyl reagent is employed in place of a Grignard reagent. Under these conditions the reaction proceeds in the expected manner to produce the corresponding tertiary alcohol.

In accordance with the present invention it has been found that substantial yields of ketones are produced by the reaction of Grignard reagents with esters according to the following reaction:

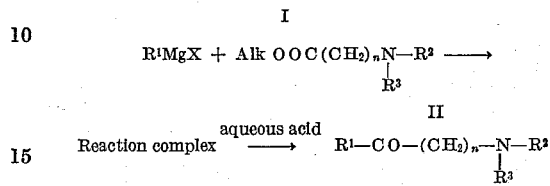

wherein $R^1$ is a radical selected from the class consisting of thienyl, aryl, haloaryl, methoxyaryl, and aralkyl radicals having not over 7 carbon atoms, $n$ is an integer of from 4 to 10, $R^2$ is a radical selected from the class consisting of the alkyl, alkenyl, cycloalkyl and aralkyl radicals containing not over 7 carbon atoms, $R^3$ is selected from the class consisting of the alkyl, alkenyl and cycloalkyl radicals containing not over 7 carbon atoms and —$NR^2R^3$ may be a heterocyclic radical of the class consisting of N-piperidino, N-pyrrolidino, N-morpholino and N'-alkyl-N-piperazino radicals and $R^2$ and $R^3$ together contain not over 12 carbon atoms. The compounds prepared in accordance with the process constitute valuable intermediates in the preparation of therapeutic compositions.

In the condensation of the Grignard reagent and the ester small amounts of the corresponding carbinol

III

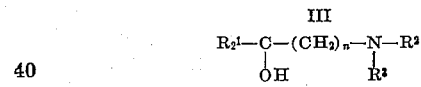

are sometimes formed which would normally be the expected product of the reaction. The carbinol however is more readily obtained by the reaction of an organo-lithium reagent.

In a further aspect of the invention the omega-(tertiary amino) alkyl ketones formed in accordance with the above reaction may be combined with organo-lithium or Grignard reagents containing organic radicals of a different nature than $R^1$ to produce compounds of the formula IIIa

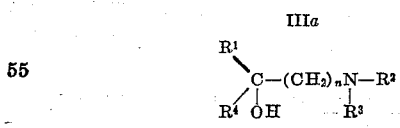

wherein $R^1$, $R^2$, $R^3$ and $n$ have the above indicated values. Preparation of carbinols of the type indicated by the previous two formulae form the subject of a copending application by the present applicant.

The above reactions are carried out, according to my invention, by forming a solution of the organo-magnesium halide in anhydrous solvent in known manner and bringing this into reaction with the ester of the omega tertiary amino acid of general Formula I above or a salt thereof by mixing the reactants together and allowing to stand, or in some cases by subsequently heating. The organo-metallic compound so formed is decomposed by the addition of water, followed by aqueous mineral acid or acetic acid. In the majority of cases a sparingly soluble salt of the basic product separates out and is removed by filtration. This salt is dissolved or suspended in a suitable solvent, such as chloroform, and the suspension shaken with an aqueous alkali, such as ammonia, when the base passes into solution in the solvent. In other cases, in which the basic product forms freely-soluble salts, the aqueous solution of the salt formed by the acid treatment is basified by the addition of an alkali and the base separated by extraction with a solvent therefor, such as chloroform. The base may be recovered from the extract by evaporation and is purified by crystallization or disillation under reduced pressure. The mixture of ketone of general Formula II and carbinol of general Formula III above which is obtained in some cases is advantageously separated by fractional distillation under reduced pressure. Of the products so obtained the ketones are usually colorless liquids and the carbinols water-insoluble, colorless, crystalline compounds. Each may be converted to crystalline water-soluble salts such as the hydrochloride by treatment with salt-forming acids.

Further, according to our invention, the substituted omega-(tertiary amino) alkyl ketones of general Formula II may be converted into the corresponding quaternary ammonium salts of the formula

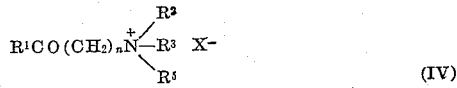

(IV)

in which $R^1$, $R^2$, $R^3$ and $n$ have the same meaning as above, $R^5$ is an alkyl or aralkyl radical, and $X^-$ is an acid radical selected from the group consisting of the chloride, bromide, iodide or methosulphate radicals.

The quaternization may be effected in a solvent such as anhydrous acetone, methanol, ethanol, dioxan at room temperature or at the boiling point of the solvent or at intermediate temperatures. Preferably an excess of quaternizing agent is employed. The solvent and the quantity used are preferably so selected that the quaternary salt crystallizes from the reaction mixture on cooling. In cases where this cannot conveniently be achieved a liquid is added gradually to the reaction product until crystallization commences. The quaternary salts are crystalline solids, soluble in water.

The compounds prepared according to the invention described above are useful as therapeutic agents and also can serve as intermediate products for the manufacture of therapeutically useful substances.

The invention is illustrated by the following examples:

Example 1

4-N-piperidinovaleric acid ethyl ester (Thomas and McElvain, Journal of the American Chemical Society, 1934, volume 56, page 1809) (50 g.) is added in small portions to an ether solution of the Grignard reagent made from bromobenzene (110 g.) and magnesium (21 g.), stirred and cooled in a bath kept at 0° C. After heating under reflux for 6 hours, the mixture is then cooled to 0° C. and stirred into crushed ice. Acetic acid is then added gradually to the stirred mixture, cooled to 0° C., until the mixture is acidic to litmus. After stirring for a further 30 minutes the salt which separates is removed by filtration and washed with ether. The salt is dissolved in chloroform, shaken with excess ammonia solution and the chloroform layer separated, washed with water and dried by the addition of anhydrous sodium sulphate. The chloroform is evaporated, leaving an oil which is submitted to fractional distillation under reduced pressure and phenyl (4-N-piperidinobutyl) ketone is collected at 133–135° C./0.1 mm. as a colorless oil.

To prepare N-methyl-N-(4-benzoylbutyl-piperidinium iodide, the tertiary amino ketone (2 g.) described above is dissolved in anhydrous acetone (5 cc.), methyl iodide (2 g.) added and the mixture allowed to stand for several hours. The crystals of the quaternary iodide which separate are filtered off and recrystallized from water; the salt melts, with decomposition, at 151–153° C.

Example 2

5-N-piperidino caproic acid ethyl ester (49 g.), (prepared from 5-bromocaproic ester (Brown and Partridge, Journal of the American Chemical Society, 1944, volume 66, page 839) by the method of Drake and McElvain (Journal of the American Chemical Society, 1934, volume 56, page 698), and having boiling point 145–148° C./14 mm.) is added in small portions to an ether solution of the Grignard reagent made from bromobenzene (115 g.) and magnesium (22 g.), stirred and cooled in a bath kept at 0° C. After heating under reflux for 6 hours the reaction mixture is worked up as described in Example 1. The liquid product is subjected to fractional distillation under reduced pressure, the phenyl (5-N-piperidino amyl) ketone being collected at 147–152° C./0.1 mm. as a colorless, viscous oil.

To prepare N-methyl-N-(5-benzoylpentyl) piperidium iodide, the tertiary amino ketone (2 g.) described above is dissolved in acetone (5 cc.), methyl iodide (2 g.) added, and the mixture allowed to stand for several hours. The crystalline quaternary iodide which separates is filtered off, and after recrystallization from ethanol has melting point 160–162° C.

5-N-piperidino caproic acid ethyl ester reacted as indicated above with the Grignard reagent prepared from bromo(p-chloro)benzene and magnesium to yield p-chlorophenyl (piperidino amyl) ketone as a viscous oil.

Example 3

8-piperidino nonoic acid ethyl ester (38.5 g.) (B. P. 140–145° C./0.75 mm., obtained by treating piperidine with 8-bromononoic acid ethyl ester as prepared by the method of Hunsdiecker, Ber., 1942, 75B, 291) is added slowly to the Grignard reagent prepared from bromobenzene (45 ml.) and magnesium (10.46 g.) in ethereal solution, stirred and cooled at 0° C. After refluxing for a further 6 hours the reaction mixture is worked up as described in Example 1. Distillation of the residue under reduced pressure gave phenyl-(8-N-piperidinooctyl) ketone as a colorless mobile oil, B. P. 175–180° C./0.01 mm. (29.9 g.), and 1:1-diphenyl-9-(1-piperidino)non-an-1-ol collected at 220–225° C./0.01 mm. as a viscous oil (11.1 g.) which crystallized from light petroleum as colorless prisms, M. P. 71–72° C.

*Example 4*

10-bromoundecyclic acid (Perkins and Cruz, Journal of the American Chemical Society, 1927, volume 49, page 1070) is converted into ethyl-10-bromoundecylate (Bokil and Nargund, Journal of the University of Bombay, 1937, volume 6, page 93) which on treatment with piperidine gives ethyl-10-piperidino undecylate, B. P. 150–156° C./0.4 mm. The above ester (21.25 g.) is added in small portions to an ether solution of the Grignard reagent prepared from bromobenzene (53.5 g.) and magnesium (8.2 g.). After proceeding as in Example 1, the phenyl-(10-N-piperidinodecyl) ketone is obtained as an oil, B. P. 180–186° C./0.01 mm. (13 g.) while the 1:1 - diphenyl-11 - (1' - piperidino)undecan-1-ol is collected at 220–225° C./0.01 mm. as a viscous oil which crystallizes from light petroleum as colorless prisms, M. P. 56° C. (7.9 g.).

N-methyl - N - (10-benzoyldecyl)piperidinium iodide prepared from the above ketone by treatment in acetone solution with methyl iodide crystallizes from a mixture of methanol and ether as colorless prisms, M. P. 114° C.

*Example 5*

5-N-pyrrolidino caproic acid ethyl ester (21.4 g.) (prepared from 5-bromo-caproic acid ethyl ester (Brown and Partridge, Journal of the American Chemical Society, 1944, volume 66, page 839), by the method of Drake and McElvain (Journal of the American Chemical Society, 1934, volume 56, page 698) and having boiling point 140–145° /14 mm.) is added in small portions to an ether solution of the Grignard reagent made from benzyl chloride (38 g.) and magnesium (7.3 g.), stirred and cooled in a bath kept at 0° C. After heating under reflux for 4 hours the mixture is worked up by cooling to 0° C. and poured on to crushed ice. Acetic acid is then added gradually to the stirred mixture, cooled to 0° C., until the mixture is acidic to litmus. The aqueous layer is then separated and saturated with potassium iodide by addition of the solid salt till some remains undissolved. The semi-solid iodide of the basic ketone which precipitates is extracted with chloroform. The chloroform layer is separated, basified by stirring with excess ammonia solution, again separated, washed with water, dried over anhydrous sodium sulphate and the solvent removed by distillation. The liquid product is subjected to fractional distillation under reduced pressure, the 1-N-pyrrolidino - 7 - phenylheptan-6-one being collected at 148–150° C./0.2 mm. as an almost colorless viscous oil.

*Example 6*

5-N-pyrrolidinocaproic acid ethyl ester (21.4 g.) is reacted as in Example 1 with the Grignard reagent prepared from p-bromotoluene (51.3 g.) and magnesium (7.3 g.). After working up as in Example 1, the residual oil is subjected to distillation under reduced pressure, the 1-N-pyrrolidino-6-p-tolylhexan-6-one being collected at 158–160° C./0.2 mm. as a colorless viscous oil which rapidly solidifies and has M. P. 45–47° C.

*Example 7*

5-N-pyrrolidinocaproic acid ethyl ester (21.4 g.) is reacted as in Example 1 with the Grignard reagent prepared from p-bromoanisole (56.1 g.) and magnesium (7.3 g.). After working up as in Example 1 the residual oil is subjected to fractional distillation under reduced pressure, the 1-N-pyrrolidino - 6 - p-methoxyphenylhexan - 6-one being collected at 168–174° C./0.1 mm. as an almost colorless viscous oil which rapidly solidifies and then has M. P. 39–42° C.

*Example 8*

5-N-methyl-N-benzylamino caproate (26.3 g.) (prepared by the methods indicated above and having boiling point 199–202° C./15 mm.) is reacted as in Example 1 with the Grignard reagent prepared from bromobenzene (47 g.) and magnesium (7.3 g.). After working up as in Example 1, the residual oil is subjected to fractional distillation under reduced pressure, the 1-N-methyl-N-benzylamino-6-phenylhexan - 6-one being collected at 190–196° C./0.4 mm. as an almost colorless viscous oil.

5-N'-methyl-N-piperazino caproate reacted as indicated above with the Grignard reagent prepared from bromobenzene and magnesium to give 1 - N'-methyl-N-piperazino-6-phenylhexan-6-one as an oil.

*Example 9*

5-Bromocaproic acid ethyl ester (33.5 g.) and dicyclohexylamine (108 g.) are mixed and heated in an oil bath at 160° C. for 7 hours. After filtration from dicyclohexylamine bromide, the liquid product is subjected to fractional distillation under reduced pressure, the ethyl ester of 5-dicyclohexyl-aminocaproic acid being collected at 158–160° C./0.2 mm.

5-dicyclohexylaminocaproic acid ethyl ester (24.2 g.), prepared as above, is reacted as in Example 1 with the Grignard reagent prepared from bromobenzene (35.3 g.) and magnesium (5.5 g.). After working up as in Example 1 the residual oil is submitted to fractional distillation under reduced pressure, the 1-dicyclohexylamino-6-phenylhexan-6-one being collected at 210–215° C./0.2 mm.

*Example 10*

5-N-morpholinocaproic acid ethyl ester (22.9 g.) (prepared from 5-bromocaproic acid ethyl ester by the method of Drake and McElvain (Journal of the American Chemical Society, 1934, volume 56, page 698) and having boiling point 170–183°/12 mm.) is reacted as in Example 1 with the Grignard reagent prepared from bromobenzene (22.9 g.) and magnesium (7.3 g.). After working up as in Example 1 the residual oil is submitted to fractional distillation, the 1-N-morpholino-6-phenylhexan-6-one being collected at 170–180° C./0.3 mm.

*Example 11*

Ethyl 5-N-diallylaminocaproate (7.5 g.) (B. P. 100–102° C./0.4 mm.) is slowly added to the Grignard reagent prepared from bromobenzene (24.6 g.) and magnesium (3.8 g.) in either solution, stirred and cooled in a bath at 0° C. After refluxing for 6 hours the reaction mixture is worked up as described in Example 1. The residual oil is subjected to distillation under reduced pressure. Phenyl-(5-diallylamino-amyl) ketone is collected as a colorless oil (4.6 g.) at 130–140° C./0.1 mm. and 1:1-diphenyl-(6-allylamino)pentan-1-ol at 160–170° C./0.01 mm. as a viscous oil which crystallizes from light petroleum as colorless prisms, M. P. 75° C. (3.2 g.).

Example 12

5-N-pyrrolidino caproic acid ethyl ester (21.4 g.) is added in small portions to an ether solution of thienyl magnesium bromide prepared from 2-bromothiophene (49 g.) and magnesium (7.3 g.), stirred and cooled in a bath kept at 0° C. After boiling under reflux for 4 hours the reaction mixture is worked up as in Example 1. The residual oil is distilled under reduced pressure, the 6-N-pyrrolidino-1-(2'-thienyl) hexan-1-one being collected at 152–154° C./0.2 mm.

5-N-dibutylamino caproic acid ethyl ester reacted as indicated above with bromobenzene and magnesium to yield 1-N-dibutylamino-6-phenylhexan-6-one as a viscous oil.

Example 13

8-Pyrrolidinononanoic acid ethyl ester (41 g.) is reacted with the Grignard reagent prepared from magnesium (11.1 g.) and bromobenzene (48 ml.), and worked up by the method of Example 1. The residual oil is distilled under reduced pressure. 9 - N - pyrrolidino - 1 - phenylhexan-1-one is collected at 180–184° C./0.1 mm. and 9-N-pyrrolidino-1:1-diphenylnonan-1-ol at 220–230° C./0.1 mm. The latter solidifies on cooling and after crystallization from light petroleum has M. P. 88° C.

Example 14

4-dimethylaminovaleric acid ethyl ester (17 g.) (prepared by heating ethyl 4-chlorovalerate with dimethylamine at 80° C., and having boiling point 100–103° C./15 mm.) is reacted as in Example 1 with the Grignard reagent prepared from magnesium (7.3 g.) and bromobenzene (47.1 g.). After working up as in Example 1, the residual oil is distilled under reduced pressure, the 5-dimethylamino-1-phenylpentan-1-one being collected at 119–122° C./0.5 mm.

The following table illustrates the relative proportions of ketones and carbinols isolated from the reaction products in preparing the derivatives enumerated in some of the foregoing examples:

[Preparation of ketones $R'CO(CH_2)_nNR^2R^3$: Yields of ketone and of carbinol $\underset{R'}{\overset{R'}{\diagdown}}C(CH_2)_nNR^2R^3$ isolated.]

| Example No. | Ketone Prepared | | | Starting Ester | | Ketone Isolated | | | Carbinol Isolated | | |
|---|---|---|---|---|---|---|---|---|---|---|---|
| | R' | n | NR²R³ | Wt./g. | M. Wt. | Wt./g. | M. Wt. | Percent yield | Wt./g. | M. Wt. | Percent yield |
| 1 | phenyl | 4 | piperidino | 50 | 213 | 35 | 245 | 60 | ------ | ------ | ------ |
| 2 | do | 5 | do | 49 | 227 | 42 | 259 | 75 | nil | ------ | nil |
| 3 | do | 8 | do | 38.5 | 269 | 29.9 | 301 | 70 | 11.1 | 379 | 20 |
| 4 | do | 10 | do | 21 | 297 | 13 | 329 | 56 | 7.9 | 407 | 27 |
| 5 | benzyl | 5 | pyrrolidino | 21.4 | 214 | 14.3 | 273 | 52 | ------ | ------ | ------ |
| 6 | p-tolyl | 5 | do | 21.4 | 214 | 16.6 | 273 | 61 | ------ | ------ | ------ |
| 7 | p-anisyl | 5 | do | 21.4 | 214 | 14.7 | 289 | 51 | ------ | ------ | ------ |
| 8 | phenyl | 5 | N-methyl-N-benzylamino | 26.3 | 263 | 15 | 295 | 51 | ------ | ------ | ------ |
| 9 | do | 5 | dicyclohexylamino | 24.2 | 323 | 11 | 355 | 42 | ------ | ------ | ------ |
| 10 | do | 5 | N-morpholino | 22.9 | 229 | 8 | 261 | 31 | 15 | 339 | 44 |
| 11 | do | 5 | diallylamino | 7.5 | 239 | 4.6 | 259 | 57 | 3.2 | 349 | 29 |

The foregoing yields are not to be taken as optimal or as those invariably to be expected but are presented as being typical of those obtained in the ordinary operation of this invention.

I claim:

The process of preparing omega-(tertiary amino) alkyl ketones of the formula $$R^1-CO-(CH_2)_n-N-R^2$$
$$\phantom{R^1-CO-(CH_2)_n-N-}|$$
$$\phantom{R^1-CO-(CH_2)_n-N-}R^3$$

wherein $R^1$ is a radical selected from the class consisting of thienyl, benzyl and homocyclic aryl radicals having not over 7 carbon atoms, n is an integer of 4 to 10, $R^2$ is a radical selected from a class consisting of alkenyl, cycloalkyl and aralkyl radicals containing not over 7 carbon atoms, $R^3$ is selected from a class consisting of the alkyl, alkenyl and cycloalkyl radicals containing not over 7 carbon atoms and $R^2$ and $R^3$ in combination containing not over 12 carbon atoms and $$N-R^2$$
$$|$$
$$R^3$$

can be a heterocyclic radical of the class consisting of N-piperidino, N-pyrrolidino, N-morpholino and N'-alkyl-N-piperazino radicals, which process comprises reacting together a Grignard reagent of the formula $R^1MgX$ with an ester of the formula $$AlkOOC(CH_2)_nN-R^2$$
$$\phantom{AlkOOC(CH_2)_nN-}R^3$$

wherein $R^1$, $R^2$, $R^3$ and n have the above-mentioned values, hydrolyzing the reaction complex, and recovering the omega-(tertiary amino) alkyl ketone in substantial yield.

PAUL ANTHONY BARRETT.

References Cited in the file of this patent

Ochiai et al., Chem. Abstracts, vol. 32, col. 8427 (1938).

Feist et al., Chem. Abstracts, vol. 33, 1327 (1939).